United States Patent
Schaich

(10) Patent No.: US 12,025,274 B2
(45) Date of Patent: Jul. 2, 2024

(54) TANK DEVICE FOR STORING A GASEOUS MEDIUM AND METHOD FOR PRODUCING A TANK DEVICE

(71) Applicant: Robert Bosch GmbH, Stuttgart (DE)

(72) Inventor: Udo Schaich, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 17/627,504

(22) PCT Filed: Jun. 8, 2020

(86) PCT No.: PCT/EP2020/065823
§ 371 (c)(1),
(2) Date: Jan. 14, 2022

(87) PCT Pub. No.: WO2021/008777
PCT Pub. Date: Jan. 21, 2021

(65) Prior Publication Data
US 2022/0260214 A1    Aug. 18, 2022

(30) Foreign Application Priority Data
Jul. 17, 2019 (DE) ............ 10 2019 210 514.9

(51) Int. Cl.
*B21D 1/00* (2006.01)
*F17C 13/04* (2006.01)

(52) U.S. Cl.
CPC ...... *F17C 13/04* (2013.01); *F17C 2201/0119* (2013.01); *F17C 2203/0639* (2013.01); *F17C 2205/0391* (2013.01); *F17C 2209/2181* (2013.01); *F17C 2209/234* (2013.01); *F17C 2221/012* (2013.01); *F17C 2223/0123* (2013.01); *F17C 2260/013* (2013.01); *F17C 2270/0184* (2013.01)

(58) Field of Classification Search
CPC ............ F17C 2209/2181; F17C 13/04; F17C 2203/0639; F17C 2223/0123
See application file for complete search history.

(56) References Cited

U.S. PATENT DOCUMENTS

| 4,386,309 A | * | 5/1983 | Peschka | ............ H01M 10/44 62/239 |
| 2003/0066836 A1 | | 4/2003 | Sakaguchi et al. | |
| 2019/0152312 A1 | | 5/2019 | Park et al. | |

FOREIGN PATENT DOCUMENTS

| CN | 1074990 A | 8/1993 |
| CN | 1265080 A | 8/2000 |

(Continued)

OTHER PUBLICATIONS

Translation of International Search Report for Application No. PCT/EP2020/065823 dated Sep. 25, 2020 (2 pages).

*Primary Examiner* — Stephen J Castellano
(74) *Attorney, Agent, or Firm* — Michael Best & Friedrich LLP

(57) ABSTRACT

The invention relates to a tank device (1) for storing a gaseous medium, in particular hydrogen, comprising at least one tank reservoir (3), wherein said at least one tank reservoir (3) comprises a tank housing (30) having a tank neck (2). Furthermore, a tank pressure bottom (8) is arranged in the tank neck (2), which tank pressure bottom (8) separates a tank neck space (7) and a tank interior (6) from one another, and wherein said tank neck (2) has an outer thread (10) as an abutment on an outer side (20).

12 Claims, 3 Drawing Sheets

(56) References Cited

FOREIGN PATENT DOCUMENTS

| | | | |
|---|---|---|---|
| CN | 101858432 | A | 10/2010 |
| CN | 102612472 | A | 7/2012 |
| CN | 102695906 | A | 9/2012 |
| CN | 103429501 | A | 12/2013 |
| CN | 105121933 | A | 12/2015 |
| CN | 105198195 | A | 12/2015 |
| CN | 106795999 | A | 5/2017 |
| DE | 202016006546 | U1 | 7/2017 |
| DE | 102018209057 | A1 | 12/2019 |
| FR | 861544 | A | 2/1941 |
| JP | H0826311 | A | 1/1996 |
| JP | 3033623 | U | 1/1997 |
| JP | 2001349494 | A | 12/2001 |
| JP | 2003090499 | A | 3/2003 |
| JP | 2007232024 | A | 9/2007 |
| JP | 2009121568 | A | 6/2009 |
| JP | 2011149545 | A | 8/2011 |
| JP | 2015169323 | A | 9/2015 |
| WO | 2012041939 | A1 | 4/2012 |
| WO | 2020052835 | A1 | 3/2020 |
| WO | 2020120074 | A1 | 6/2020 |

\* cited by examiner

TANK DEVICE FOR STORING A GASEOUS MEDIUM AND METHOD FOR PRODUCING A TANK DEVICE

This application is the national stage of international application No. PCT/EP2020/065823 filed 8 Jun. 2020.

BACKGROUND

The invention relates to a tank device for a fuel cell tank, in particular for storing hydrogen, for example for use in vehicles with a fuel cell drive, and to a method for producing such a tank device.

DE 10 2018 209 057 A1, which is not a prior publication, describes a tank device for temperature pressure release of a fuel cell tank, wherein the tank device comprises tank containers with different valves, such as, for example, a shut-off valve, which ensures correct functioning of a fuel cell system, for example.

The safety devices for a tank device of this type are standardized. In this context, each tank device has to have a shut-off valve of this type. Thus, the shut-off valve can ensure that the tank containers are closed if there is damage to the tank device caused by an accident involving the vehicle with a fuel cell drive or if there is a break in a line of the tank device, since the shut-off valves are closed in the currentless state. Thus, in the event of accidents and defects, it is always possible to avoid gas escaping from the tank containers.

Legal requirements stipulate that, depending on the container, the safety valves have to be applied directly to or even in the tank container. The safety valves are therefore directly exposed to the gaseous medium and to the system pressure, for example to system pressures of up to 1000 bar. These high forces acting on the safety valves require complicated structural measures to prevent rapid aging and thus failure of the safety valves.

SUMMARY

By contrast, the tank device according to the invention has the advantage that, despite a multiplicity of tank containers in the tank device and the safety valves prescribed for this purpose, a cost-effective and reliable solution is obtained without minimizing the safety of these tank devices.

For this purpose, the tank device for storing a gaseous medium, in particular hydrogen, has at least one tank container. The at least one tank container has a tank housing with a tank neck. Furthermore, a tank pressure base is arranged in the tank neck, which tank pressure base separates a tank neck space and a tank interior from each other, and which tank neck has an external thread as an abutment.

Furthermore, the invention comprises a method for producing a tank device, wherein the at least one tank container is manufactured from steel and has a certain melting point, characterized by the following steps:
 heating both ends of the at least one tank container up to the certain melting point;
 deforming the ends of the at least one tank container to produce a tank neck by means of molding tools;
 internally deforming the tank neck by means of a stretching and compression process to produce a double tank pressure base, wherein at least two mandrels are introduced simultaneously or alternately into the tank neck and the tank neck is thus shaped inward;
 repeating the previous step until a predetermined geometrical shape and rigidity of the tank pressure base is reached.

In an advantageous development of the method, the predetermined geometrical shape of the tank pressure base corresponds in cross section to a circular disk.

Furthermore, the invention comprises an alternative method for producing a tank device, wherein the at least one tank container is manufactured from steel and has a certain mounting point, characterized by the following steps:
 heating both ends of the at least one tank container up to the certain melting point;
 deforming the ends of the at least one tank container to produce a tank neck by pressing or shrinking a likewise heated solid material thereon;
 introducing any selected geometries into the solid material in order to produce a double tank pressure base in the tank neck.

The loadings on the components of the tank device, in particular the valve device, can thus be reduced by the force engagement surfaces on the valve device being kept as small as possible. If the force engagement surface is reduced to the components used in the tank neck, this also leads to a general reduction in the force loading on the tank container.

In addition, simple production is possible by means of the shape of the tank container, which is comparable to a commercially available beverage bottle, and the uniform tapering from the maximum diameter of the cylindrical tank container.

In a first advantageous development, it is provided that a tank pressure base opening is formed in the tank pressure base. Filling or emptying of the tank container can thus be ensured in a structurally simple manner.

In a further refinement of the invention, it is advantageously provided that the at least one tank container is configured for a differential pressure of 1 to 1000 bar in relation to atmospheric pressure. The use of the gaseous media in the tank container can thus be optimized.

In an advantageous development, the tank neck is cylindrical and merges as a conical widened portion into a cylindrical tank body, wherein a diameter d of the tank neck is smaller than a diameter D of the tank body. The shape permits a uniform distribution of pressure within the tank container. The maximum opening at the tank neck of the tank container and the associated maximum pressure engagement surface are typically determined by the function which components in the tank neck have to carry out and the mechanical loadings which act on the components and the dimensioning which is necessary. For the volumetric flow from the tank container, a small opening is required here, and therefore typically these components have thicker walls than is necessary for their function. It is therefore proposed in this invention to introduce a base in the tank neck, the base reducing the force engagement surface to the components in the tank neck by a large portion of the compressive forces being absorbed within the bottle structure. The pressure-loaded opening on the tank container can therefore be dimensioned to be only of a size required for the required volumetric flows and for providing the sealing elements.

In an advantageous development, it is provided that the at least one tank container is produced from a plastics material, a carbon fiber material or steel. A cost-saving design of the tank container is thus obtained.

In a further refinement of the invention, it is advantageously provided that a valve device is arranged in the tank neck of the tank container coaxially with respect to the longitudinal axis of the tank container. The valve device can thus be integrated in a structurally simple manner as a safety valve in the tank container, the valve device being protected against damage caused by external influences, such as, for example, shocks during operation.

The tank device described is suitable preferably in a fuel cell arrangement for storing hydrogen for operating a fuel cell. Preferably, the tank device described can be used in a vehicle with a fuel cell drive.

BRIEF DESCRIPTION OF THE DRAWINGS

Exemplary embodiments of a tank device according to the invention for storing a gaseous medium, in particular hydrogen, are illustrated in the drawing, in which.

DETAILED DESCRIPTION

Figure 1:
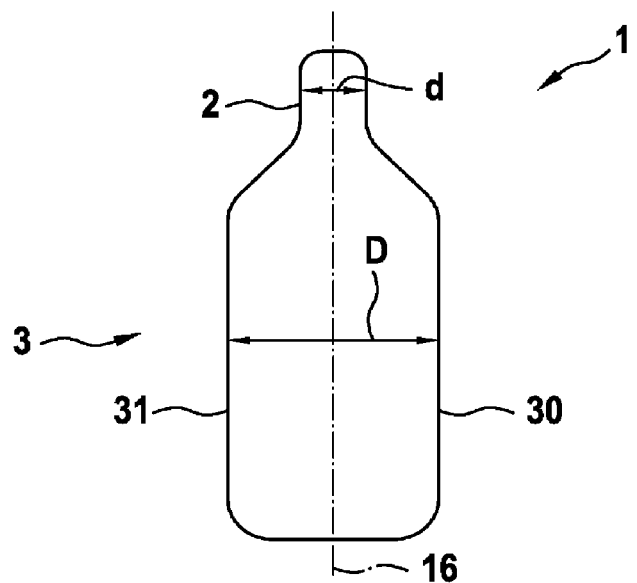
FIG. 1 shows an exemplary embodiment of a tank device according to the invention comprising a tank container comprising a tank housing with a tank neck and a tank body in longitudinal section.

FIG. 1 shows an exemplary embodiment of a tank device 1 according to the invention for a gaseous medium, in particular hydrogen, in a schematic view. The tank device 1 has a tank container 3 with a tank housing 30. The tank housing 30 comprises a tank body 31 and a tank neck 2. The tank body 31 here is designed as a conical widened portion of the tank neck 2. Both the tank body 31 and the tank neck 2 are cylindrical, with the diameter D of the tank body 31 being larger than the diameter d of the tank neck 2. The shape is therefore comparable to a commercially available beverage bottle.

Figure 2:
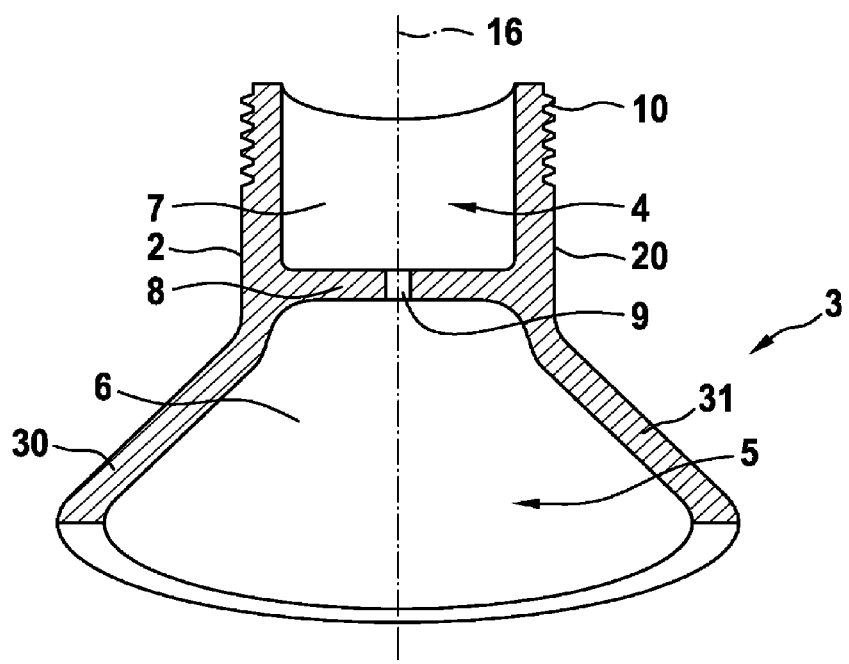
FIG. 2 shows an enlarged detail of the exemplary embodiment from FIG. 1 in the region of the tank neck.

FIG. 2 shows an enlarged view of the tank container 3 in the region of the tank neck 2 with a longitudinal axis 16 from FIG. 1 in cross section. Inside the tank container 3, at an end toward the conical widened portion of the tank container 3 to form the tank body 31, the tank neck 2 has a double tank pressure base 8 which corresponds in cross section to a circular disk. The tank pressure base 8 furthermore has a tank pressure base opening 9.

A tank interior 6 is formed in the tank body 31, said tank interior opening via the tank pressure base opening 9 into a tank neck space 7 formed in the tank neck 2.

Furthermore, the tank neck 2 has an external thread 10 as an abutment on an outer side 20, the external thread being able to be used for fastening further add-on components of the tank device 1, for example for fastening a valve device.

Figure 3:
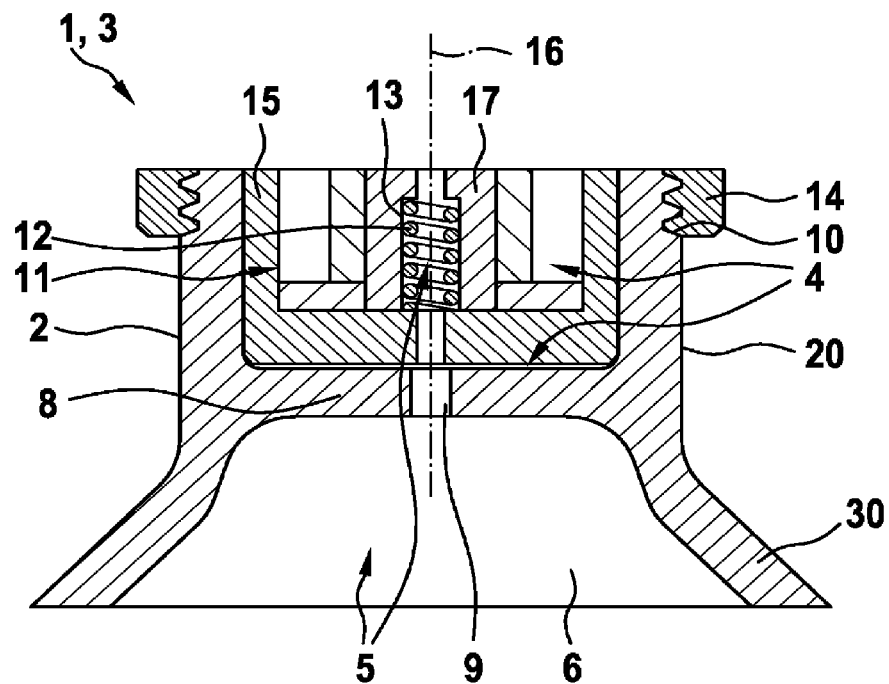
FIG. 3 shows an enlarged detail of the exemplary embodiment from FIG. 1 in the region of the tank neck with a valve device.

FIG. 3 shows an enlarged view of the tank container 3 in the region of the tank neck 2 from FIG. 1 in cross section. A valve device 11 is arranged here in the tank neck 2 coaxially with respect to the longitudinal axis 16. The valve device 11 has a valve housing 15 with which the valve device 11 is fixedly integrated in the tank container 3. This fixed integration takes place by means of a valve fastening element 14 which is screwed on the outside onto the external thread 10 of the tank neck 2. The valve fastening element 14 is fixedly connected here to the valve device 11.

Furthermore, the valve device 11 has a valve spring 12 which pretensions a valve element 17 with a force such that the valve device 11 and therefore a valve passage opening 13 formed in the valve housing 15 is closed. If a solenoid of the valve device 11 is energized, the latter can be opened such that gaseous medium, in particular hydrogen, can flow out of the tank container 3 in the direction, for example, of an anode region of a fuel cell.

The tank pressure base 8 separates the tank interior 6 from the tank neck space 7 which serves as installation space for safety components, such as, for example, the valve device 11. A low pressure region 4 is formed here between the valve device 11 and the tank neck space 7 and in the region of activation of the valve device, the solenoid. A high pressure region 5 is formed in the tank interior 6 and in the valve passage opening 13 of the valve device 11.

The tank container 3 is configured for a differential pressure of 1 bar to 1000 bar in relation to atmospheric pressure. Typically, for example in the case of fuel cell arrangements, use is made of tank containers 3 which store hydrogen at a pressure of up to 700 bar. In addition, the tank container is produced from a plastics material, a carbon fiber material or steel.

The tank device 1 is not restricted here to a tank container 3. Said tank device can have a multiplicity of the above-described tank containers 3 and, for example, can be integrated in a vehicle with a fuel cell drive. In addition, the shape of the tank container 3 is not restricted to the above-described shape of a commercially available beverage bottle, but rather can take on any desired geometries, depending on requirements.

Figure 4:
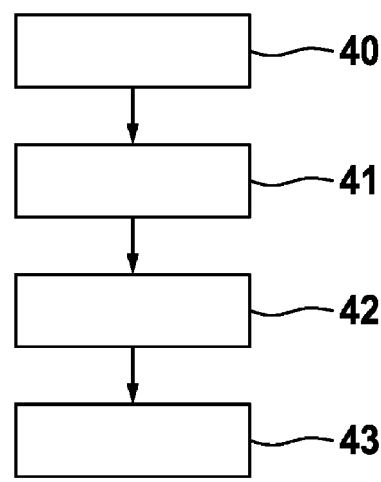
FIG. 4 shows a flow chart of a method according to the invention for producing a tank device according to the invention.

In the following, as a flow chart shows in FIG. 4, a method for producing an above-described tank device 1, which is manufactured from steel and has a certain melting point, is described:

both ends of the tank container 3 are heated up to a certain melting point, depending on the selection of the steel material (heating 40). The ends of the tank container 3 are then deformed by means of molding tools to form the tank neck 2 (deforming 41). In the next step, the tank neck 2 is internally deformed 42 by means of a stretching and compression process to produce the double tank pressure base 8, wherein at least two mandrels are introduced simultaneously or alternately into the tank neck 2 and therefore an internal deformation 42 of the tank neck 2 is obtained.

This step is repeated until a predetermined geometrical shape and rigidity are achieved (repeating 43). For example, the geometrical shape of the tank pressure base 8 corresponds in the embodiments of FIG. 1, FIG. 2 and FIG. 3 in cross section to a circular disk.

Figure 5:
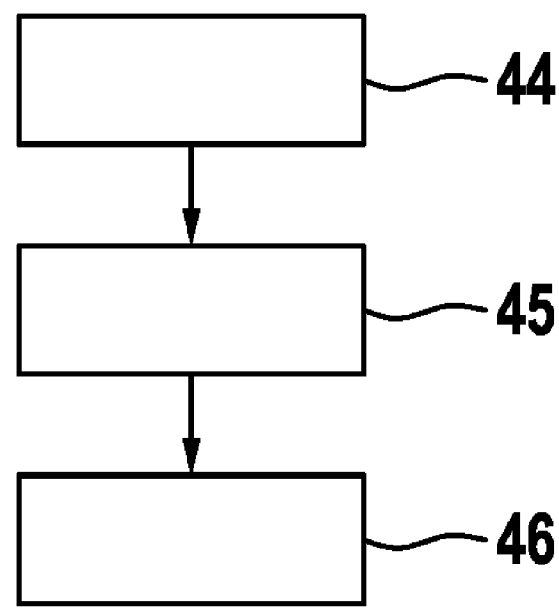
FIG. 5 shows a flow chart of an alternative method according to the invention for producing a tank device according to the invention.

A flow chart of an alternative method for producing an above-described tank device 1 which is manufactured from steel and has a certain melting point is shown in FIG. 5:

both ends of the tank container 3 are heated up to a certain melting point, depending on the choice of the steel material (heating 44). Subsequently, the ends of the tank container 3 are deformed to form the tank neck 2 by pressing or shrinking a likewise heated solid material thereon (deforming 45). By introducing 46 any selected geometries into the solid material, the geometry of the tank pressure base 8 can be correspondingly produced.

Both methods have the aim of obtaining a uniform material structure in order to exclude damage due to the use, for example, by hydrogen, or other influences or other damage during operation.

Heat treatments and other materials science processes can be used at any time, for example during the processing or in subsequent steps.

The invention claimed is:

1. A method for producing a tank device (1) for storing a gaseous medium, the tank device (1) comprising at least one tank container (3), which at least one tank container (3) has a tank housing (30) with a tank neck (2), wherein a tank pressure base (8) is arranged in the tank neck (2), which tank pressure base (8) separates a tank neck space (7) and a tank interior (6) from each other, and which tank neck (2) has an external thread (10) as an abutment on an outer side (20) wherein the at least one tank container (3) is manufactured from steel and has a melting point, the method comprising:
   a. heating (44) both ends of the at least one tank container (3) up to the melting point;
   b. deforming (45) the ends of the at least one tank container (3) to produce a tank neck (2) by pressing or shrinking a likewise heated solid material thereon;
   c. introducing (46) selected geometries into the solid material in order to produce a tank pressure base (8) in the tank neck (2).

2. A method for producing a vehicle, said vehicle having a fuel cell drive and a tank device, the tank device is provided in a step which includes the method for producing a tank device as claimed in claim 1.

3. A method for producing a fuel cell arrangement, said fuel cell arrangement comprising a tank device, the tank device is provided in a step which includes the method for producing a tank device as claimed in claim 1.

4. A method for producing a tank device (1) for storing a gaseous medium, the tank device (1) comprising at least one tank container (3), which at least one tank container (3) has a tank housing (30) with a tank neck (2), wherein a tank pressure base (8) is arranged in the tank neck (2), which tank pressure base (8) separates a tank neck space (7) and a tank interior (6) from each other, and which tank neck (2) has an external thread (10) as an abutment on an outer side (20) wherein the at least one tank container (3) is manufactured from steel and has a melting point, the method comprising:
   a. heating (40) both ends of the at least one tank container (3) up to the melting point;
   b. deforming (41) the ends of the at least one tank container (3) with molding tools to produce the tank neck (2);
   c. internally deforming (42) the tank neck (2) by a stretching and compression process to produce the tank pressure base (8), wherein at least two mandrels are introduced simultaneously or alternately into the tank neck (2) and the tank neck (2) is thus shaped inward;
   d. repeating (43) step c until a predetermined geometrical shape and rigidity of the tank pressure base (8) is reached.

5. The method as claimed in claim 4, wherein a tank pressure base opening (9) is formed in the tank pressure base (8).

6. The method as claimed in claim 4, wherein the at least one tank container (3) is configured for a differential pressure of 1 bar to 1000 bar in relation to atmospheric pressure.

7. The method as claimed in claim 4, wherein the tank neck (2) is cylindrical and merges as a conical widened portion into a cylindrical tank body (31), wherein a diameter d of the tank neck (2) is smaller than a diameter D of the tank body (31).

8. The method as claimed in claim 4, wherein a valve device (11) is arranged in the tank neck (2) of the tank container (3) coaxially with respect to a longitudinal axis (16) of the tank container (3).

9. A method for producing a vehicle, said vehicle having a fuel cell drive and a tank device, the tank device is provided in a step which includes the method for producing a tank device as claimed in claim 4.

10. A method for producing a fuel cell arrangement, said fuel cell arrangement comprising a tank device, the tank device is provided in a step which includes the method for producing a tank device as claimed in claim 4.

11. The method as claimed in claim 4, wherein the predetermined geometrical shape of the tank pressure base (8) corresponds in cross section to a circular disk.

12. The method as claimed in claim 4, wherein the gaseous medium is hydrogen.

* * * * *